Dec. 8, 1936.  F. C. ALLEN, JR  2,063,288
DISPENSING CONTAINER
Filed Sept. 13, 1934
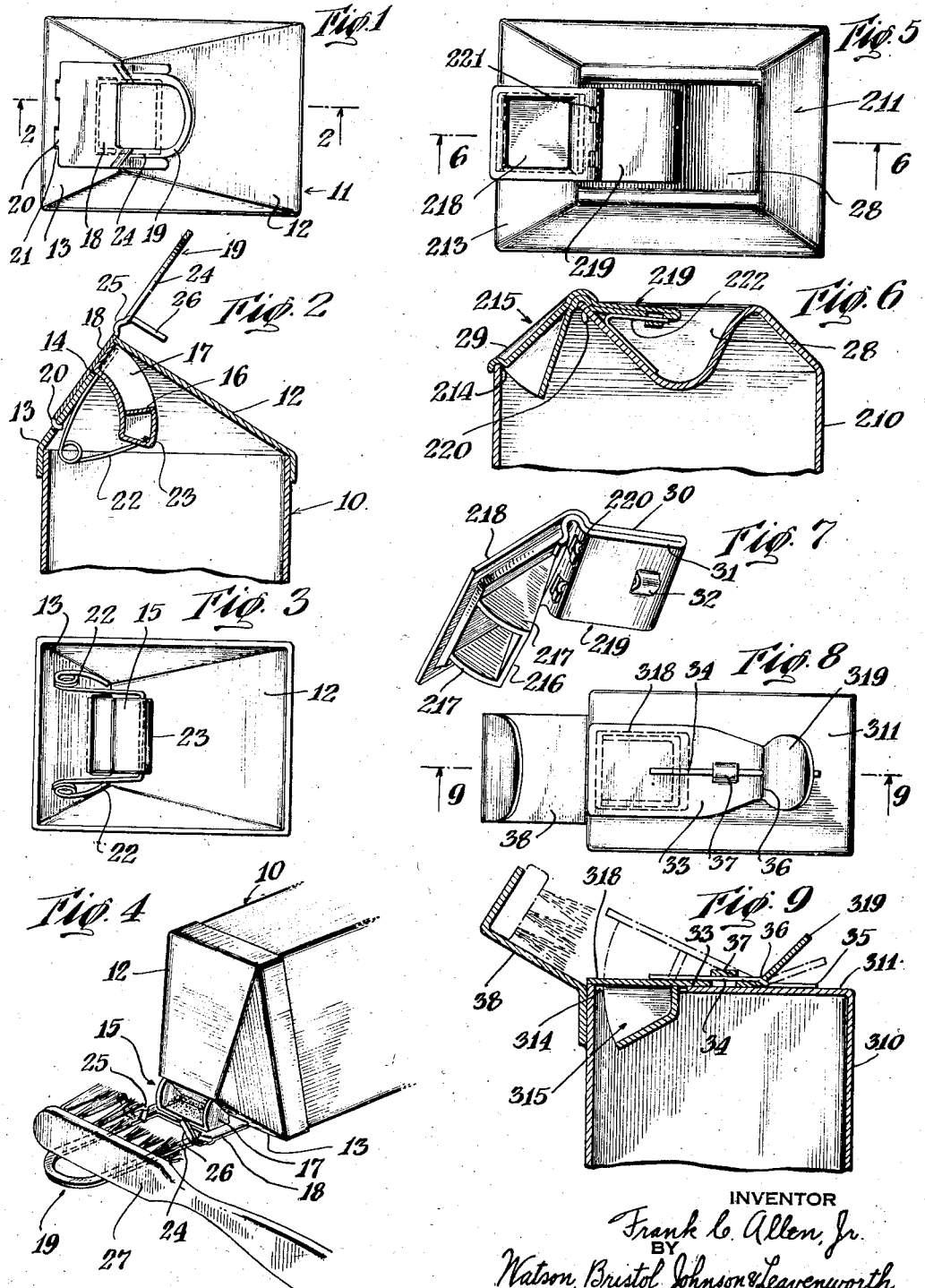

Patented Dec. 8, 1936

2,063,288

UNITED STATES PATENT OFFICE 2,063,288

DISPENSING CONTAINER

Frank C. Allen, Jr., Pelham Manor, N. Y.

Application September 13, 1934, Serial No. 743,821

8 Claims. (Cl. 221—98)

The present invention relates to dispensing containers and more particularly to containers adapted for the packaging of powdered or granular material such as tooth powder, drugs, foods, condiments and the like to be dispensed therefrom in small portions.

A general object of the invention is the provision of such a container which is provided with a simple discharge device adapted normally to keep the container closed and efficiently and readily operable to dispense therefrom predetermined portions of material, the device being constructed in a manner to insure efficient closure of the container to prevent accidental spilling of the contents.

More specific objects of the invention are the provisions of such a container which has a discharge aperture in which is seated a biased scoop adapted readily to receive the powdered or granular material in the container while serving normally as an efficient closure and operable in a simple manner to discharge only the contents of the scoop at each operation; and constructional features which insure absence of projecting parts tending to allow accidental operation, allow free access of the scoop to the contents of the container for ready refilling of the scoop, attain tight closure through the use of interfitting parts, and make possible low cost manufacture.

A further object of the invention is the provision of such a device wherein the scoop is provided with an operating handle so designed as to be efficiently operable by an instrument positioned to receive the powder discharged from the scoop, particularly for dispensing tooth powder and operable by a tooth brush with the bristles thereof positioned to receive the tooth powder discharged from the scoop, and featured by structure insuring efficient closure of the container and preventing collected moisture from approaching the discharge scoop and aperture.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawing, in which:

Fig. 1 is a top plan view of the dispensing container of the present invention;

Fig. 2 is a sectional view with parts broken away taken on line 2—2 of Fig. 1;

Fig. 3 is a bottom plan view of the top of the container shown in Figs. 1 and 2;

Fig. 4 is a perspective view of the device depicted in Figs. 1, 2 and 3, showing relative positions of operating tooth brush and dispensing device;

Fig. 5 is a top plan view of a modified form of the present invention;

Fig. 6 is a sectional view with parts broken away taken on line 6—6 of Fig. 5;

Fig. 7 is a perspective view of the scoop and associated handle of the structure shown in Figs. 5 and 6;

Fig. 8 is a top plan view of another modification of the present invention; and

Fig. 9 is a sectional view with parts broken away taken on line 9—9 of Fig. 8.

The device of the present invention consists of a container for powdered or granular material such as tooth powder, drugs, foods, condiments and the like provided with an aperture in the top thereof. A scoop is fitted into the aperture and hinged on a wall of the container. Biasing means normally causes the top of the scoop to close the aperture. A handle is provided so that the scoop may be hinged out of the aperture to allow discharge of its contents.

Referring to the drawing for a more detailed description of the invention like numerals refer to like parts throughout. A container 10 formed of any suitable sheet material is provided with a top wall 11 which in the preferred form is shaped as shown in Figs. 1, 2, 3 and 4, to have portions 12 and 13 disposed at oblique angles to each other and to the side walls of the container. In the portion 13 is provided an aperture 14 preferably rectangular in shape.

A scoop 15 is fitted into the aperture 14. The scoop is preferably arcuate-shaped and consists of a bottom wall 16, side walls 17, 17 and a top wall 18. The top wall 18 is of a dimension such that it forms a closure for the aperture 14. A handle 19 preferably integral with the scoop 15 is provided for hinging the latter out of the aperture 14. The scoop 15 is hinged on the top wall 11 by any suitable means such as by ears 20—20 engaged in apertures 21—21. A spring or springs 22 preferably positioned between a portion of the container and the scoop 15 are provided for biasing the latter.

Discharge of powder from the container when the scoop 15 is hinged out of the aperture 14 is prevented by the bottom of the scoop. A projecting portion 23 is provided on the bottom of the scoop 15 to insure this action. Preferably each of the springs 22, 22 has one end anchored on the projecting portion 23 and the other end anchored on the under side of the top wall 11 as shown in Figs. 2 and 3. It is understood that any suitable biasing means for the scoop may be used, for example a single spring in lieu of the two springs 22, 22, having one end secured near the center of the bottom of the scoop or provided with a pair of arms one secured to each side of the scoop.

The handle 19 is preferably formed in the shape of a loop, as shown. When the container is used to dispense tooth powder any moisture from a wet tooth brush which may collect on the handle will flow down the members 24, 24, constituting the sides of the handle loop 19 to angularly disposed grooves 25, 25 which serve as gutters to direct the moisture away from the aperture 14 and associated scoop 15.

Lugs 26, 26 on the handle 19, preferably integral therewith, serve as stops in a manner to be explained below.

In operation the top wall 18 normally closes the aperture 14 and the spring or springs 22, 22 maintain the scoop 15 in the closed position. By disposing the scoop 15 in an aperture formed in the portion 13 disposed at oblique angles to the container walls the contents of the container are freely accessible to the open mouth thereof. Inversion of the container 10 allows the powdered contents to fill the scoop 15. With the container inverted the operator holds the bottom thereof substantially horizontal and places an instrument adapted to receive the powder discharged from the scoop 15, such as a tooth brush 27 against the handle 19. In dispensing tooth powder the brush 27 is placed against the handle 19 with the bristles positioned against the lugs 26, 26 as shown in Fig. 4. The scoop 15 is swung out of the aperture 14 by pressure against the handle 19 applied with the instrument or brush 27 and the powdered material in the scoop 15 falls into or upon the instrument or the bristles of the brush. During this action the projecting portion 23 of the scoop 15 cooperates with the bottom of the scoop to close the aperture thereby preventing discharge of powder other than that contained in the scoop 15. When released the scoop is hinged by springs 22, 22 into the container 10 for refilling and to serve as an efficient closure.

In the modification depicted in Figs. 5, 6 and 7, the container 210 is provided with a top wall 211 having an obliquely disposed portion 213 in which is located an aperture 214. A scoop 215 having a bottom wall 216, side walls 217, 217 and a top wall 218 is fitted into the aperture 214 with the top 218 forming a closure for the aperture. A handle 219, preferably integral with the scoop 215, is provided for hinging the scoop out of the aperture 214. The scoop 215 is hinged on the top wall 211 by suitable means such as struck out ears 220—220 engaged in apertures 221—221. A leaf spring 222 positioned between a portion of the container and the handle 219 biases the scoop 215. In the top wall 211 is formed a depression 28 in which is disposed the handle 219. The use of a projecting handle which might accidentally be depressed is thereby avoided.

To insure a tight closure a groove 29 is formed in the top wall 218 of the scoop 215. This groove interfits with the edges of the aperture 214 or if desired may cooperate with a bead formed in the container wall around the aperture.

The scoop 215 and the associated handle 219 may be made integral therewith in a minimum of operations by forming it from a blank of sheet material. The blank of sheet material is doubled upon itself to form an upper ply 30 and a lower ply 31. The upper ply 30 forms the top wall 218 of the scoop and the lower ply 31 is shaped to form the bottom and side walls 216 and 217, 217 of the scoop. The ears 220—220 are struck out from the lower ply 31 as is a loop 32 adapted to receive one end of the spring 222.

In operation the scoop 215 normally forms a closure for the container. Inversion of the container fills the scoop 215 and when the handle 219 is depressed the scoop 215 is hinged out of the aperture 214 to allow the contents of the scoop to flow freely therefrom, the bottom wall 216 preventing discharge of the contents of the container. When the empty scoop 215 is allowed to return to the closed position the open mouth thereof is again presented to the contents of the container for refilling.

A further modification is shown in Figs. 8 and 9. The container 310 as in the other modifications has a top wall 311 provided with an aperture 314. A scoop 315 is fitted into the aperture, the top wall 318 thereof serving as a closure for the aperture 314. The scoop 315 is provided with an arm 33 which is seated upon the top wall 311. A projecting handle 319 is provided upon the arm 33. This structure is mounted on the container by means of a leaf spring 34 secured at 35 to the top wall 311 in any suitable manner such as by soldering. The leaf spring 34 extends through a hole 36 in the arm 33 and the end thereof is positioned under a loop 37 struck up from the arm 33. The operation is similar to that of the structure shown in Figs. 5, 6 and 7. It is obvious that similar interfitting portions may be formed on the wall of the container and scoop to insure a tight closure and that the arm 33 and handle 319 may be disposed within a depression in the top of the container, the chief difference being the omission of structure separate from the leaf spring for hinging the scoop on the wall of the container.

The container 310 may be provided with a suitable bracket 38 to receive an instrument such as a tooth brush (shown in broken lines, in Fig. 9) positioned to receive powder from the scoop 315 when hinged to the dispensing position (also shown in broken lines). Similar structure may be provided for the container shown in Figs. 5 and 6.

It will thus be seen that the device of the present invention efficiently attains the objects set forth above and since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In a dispensing container the combination of an apertured wall of the container, a measuring scoop fitted into the aperture and hinged on said wall along one edge of the top of said scoop, and a handle integral with and extending from the opposite edge of the top of said scoop to hinge the latter out of said aperture; said handle being formed to receive an instrument and be operated thereby when said instrument is positioned to receive the powdered or granular contents of said scoop, and being positioned with respect to said scoop to be out of the path of the discharged material.

2. In a dispensing container the combination of an apertured wall of the container, a scoop fitted into the aperture and hinged on said wall, a handle extending from said scoop to hinge said scoop out of the aperture, said handle being formed to receive a tooth brush and operable thereby when the latter is positioned to receive the powdered or granular contents of said scoop, means on said handle to prevent moisture from said tooth brush from approaching the aperture and said scoop, and biasing means normally to cause the top of said scoop to close the aperture.

3. In a dispensing container a top wall having a discharge aperture therein, a cover for the aperture, means on one side of the aperture to hinge said cover on said wall, a handle connected to said cover on the side opposite said hinging means and associated therewith in a manner to form a rigid lever for hinging said cover away from the aperture, an arcuate-shaped measuring scoop fitted into the aperture and rigidly associated with said cover between said handle and said hinging means; said handle being formed to engage an instrument and be operated thereby when said instrument is positioned to receive the powdered or granular contents of said scoop, and being positioned with respect to said scoop to be out of the path of the discharged material.

4. In a dispensing container a top wall having a discharge aperture therein, a cover for the aperture, means on one side of the aperture to hinge said cover on said wall, a handle connected to said cover on the side opposite said hinging means and associated therewith in a manner to form a rigid lever for hinging said cover away from the aperture, an arcuate-shaped measuring scoop fitted into the aperture and rigidly associated with said cover between said handle and said hinging means; said handle comprising a pair of rigid members extending from opposite sides of said scoop and formed to engage an instrument and be operated thereby when said instrument is positioned to receive the powdered or granular contents of said scoop, said rigid handle members being positioned with respect to said scoop to be out of the path of the discharged material.

5. In a dispensing container a top wall having a discharge aperture therein, a cover for the aperture, means to hinge said cover on said wall, a handle extending from said cover, an arcuate-shaped scoop fitted into the aperture and secured to said cover between said handle and said hinging means, said handle comprising a pair of members extending from opposite sides of said scoop and provided with means to deflect moisture running down said members, and biasing means mounted between said top wall and said scoop.

6. In a dispensing container a top wall having a portion disposed at an oblique angle to the side walls of the container, said portion having a rectangular aperture therein, a cover for the aperture, means to hinge said cover on said portion, a handle comprising spaced apart members extending from said cover beyond said portion, an arcuate-shaped scoop fitted into the aperture and secured to said cover between said handle and said hinging means with the spaced apart members of said handle disposed on opposite sides of said scoop, at least one spring member having one end thereof anchored to the under side of said portion and the other end thereof anchored to said scoop, and means on said handle beyond said portion adapted to aid in locating on said handle an instrument to operate said handle and receive the powdered or granular contents of said scoop.

7. In a dispensing container, a top wall having a portion disposed at an oblique angle to the side walls of the container, said portion having a rectangular aperture therein, a cover for the aperture, means to hinge said cover on said portion, a handle comprising spaced apart members extending from said cover beyond said portion, an arcuate-shaped scoop fitted into the aperture and secured to said cover between said handle and said hinging means with the spaced apart members of said handle disposed on opposite sides of said scoop, a spring bridged between said top wall and said scoop to hold the latter normally in closed position, and means on said handle beyond said portion adapted to aid in locating on said handle an instrument to operate said handle and receive the powdered or granular contents of said scoop.

8. A cover for a dispensing tooth powder container comprising a flange adapted to engage the side walls of a container, a portion disposed at an oblique angle to said flange having a rectangular aperture therein, a cover plate having ears located in holes in said portion adjacent one side of the aperture for hinging said cover plate on said portion, an arcuate-shaped scoop fitting into the aperture and secured to said cover plate, a spring biasing said scoop in said aperture, a looped handle having the side members thereof connected to said cover plate on the side opposite said ears and associated therewith in a manner to form a rigid lever for hinging said scoop out of the aperture, and a pair of spaced apart members mounted on said cover plate and extending at an angle to the face thereof to cooperate with said handle in locating a tooth brush against the latter in a position to receive tooth powder from said scoop when said handle is operated by said tooth brush, said side members of said handle loop being disposed on opposite sides of the mouth of said scoop and so located where connected to said cover plate whereby moisture from an operating tooth brush that may tend to run down said side members will not run into the mouth of said scoop.

FRANK C. ALLEN, Jr.